US006495931B2

(12) United States Patent
Loyd et al.

(10) Patent No.: US 6,495,931 B2
(45) Date of Patent: Dec. 17, 2002

(54) MODULAR CONTROLLER HOUSING FOR WATER POOL APPARATUS

(75) Inventors: Casey Loyd, Pomona, CA (US); Pedro Vargas, Pomona, CA (US)

(73) Assignee: California Acrylic Industries, Pomona, CA (US)

( * ) Notice: Subject to any disclaimer, the term of this patent is extended or adjusted under 35 U.S.C. 154(b) by 81 days.

(21) Appl. No.: 09/758,005

(22) Filed: Jan. 10, 2001

(65) Prior Publication Data

US 2002/0089235 A1 Jul. 11, 2002

(51) Int. Cl.[7] .................................................... H02J 7/30
(52) U.S. Cl. ........................ 307/149; 361/785; 361/730
(58) Field of Search .......................... 307/149; 361/728, 361/729, 735, 784, 785; 439/660, 701

(56) References Cited

U.S. PATENT DOCUMENTS 4,501,460 A * 2/1985 Sisler ......................... 361/683
4,844,333 A * 7/1989 Davis et al. .................. 236/51
5,306,174 A * 4/1994 Kiga .......................... 439/341
5,344,347 A * 9/1994 Inoue et al. ................ 439/701
5,398,711 A * 3/1995 Ardrey, Jr. .................. 137/343
5,419,721 A * 5/1995 Lignelet ..................... 439/364
6,304,188 B1 * 10/2001 Subak et al. ................ 340/635

* cited by examiner

*Primary Examiner*—Stephen W. Jackson
*Assistant Examiner*—Sharon Polk
(74) *Attorney, Agent, or Firm*—Denton L. Anderson; Sheldon & Mak

(57) ABSTRACT

A controller housing for a water pool apparatus has two separate enclosures disposed back-to-back. The two separate enclosures are electrically connectable by electrical connectors disposed in the adjoining walls of the two enclosures. The electrical connections are aligned with one another so that pressing the two enclosures towards one another automatically places the two enclosures into electrical communication. In one embodiment of the invention, the two enclosures are attached to one another by a pair of disengageable hinges.

17 Claims, 2 Drawing Sheets

MODULAR CONTROLLER HOUSING FOR WATER POOL APPARATUS

BACKGROUND OF THE INVENTION

Water pool apparatuses, such as portable spas, portable pools, in-ground spas, in-ground pools, hot tubs and recirculating bath tubs are enormously popular. Most such water pool apparatuses have a water recirculation system wherein water within a main water basin is recirculated through a filter, a heater and then back into the main water basin by a centrifugal pump.

The water recirculation system is typically controlled by a controller disposed within a controller housing. In most modern water pool apparatuses, the controller is a solid state electronic controller comprising an electrical circuit board having a large number of related electrical wiring connections.

A problem arises when the electrical circuit board of the controller wears out or otherwise fails. Replacing the electrical circuit board and reconnecting all of the related electrical wires to the electrical circuit board is awkward, time-consuming and requires the employment of a trained technician. This makes replacement of the electrical circuit board arduous and expensive.

Accordingly, there is a need for a water pool apparatus controller and controller housing which avoids the aforementioned problems in the prior art in an efficient and cost-effective manner.

SUMMARY OF THE INVENTION

The invention satisfies this need. The invention is a modular controller housing comprising (a) a first box defining a first enclosure, the first box having a plurality of walls, including a connection wall with an interior surface and an exterior surface, the connection wall of the first box having a first moiety of an electrical connector disposed on its exterior surface, the first moiety of the electrical connector being electrically connected to the first enclosure, and (b) a second box attached to the first box, the second box defining a second enclosure, the second enclosure having an electrical circuit board disposed therein, the electrical circuit board having control circuitry for controlling the operation of the water recreational apparatus, the second box having a plurality of walls including a connection wall with an interior surface and an exterior surface, the connection wall of the second box having a second moiety of the electrical connector disposed on its exterior surface, the second moiety of the electrical connector being electrically connected to the electrical circuit board, the second moiety of the electrical connector being operatively connectable to the first moiety of the electrical connector by aligning the first moiety with the second moiety and by pressing the connection wall of the first box toward the connection wall of the second box, thereby connecting the electrical circuit board to the first enclosure.

DESCRIPTION OF THE DRAWINGS

These and other features, aspects and advantages of the present invention will become better understood with reference to the following description, appended claims and accompanying drawings where:

DETAILED DESCRIPTION

Figure 1:
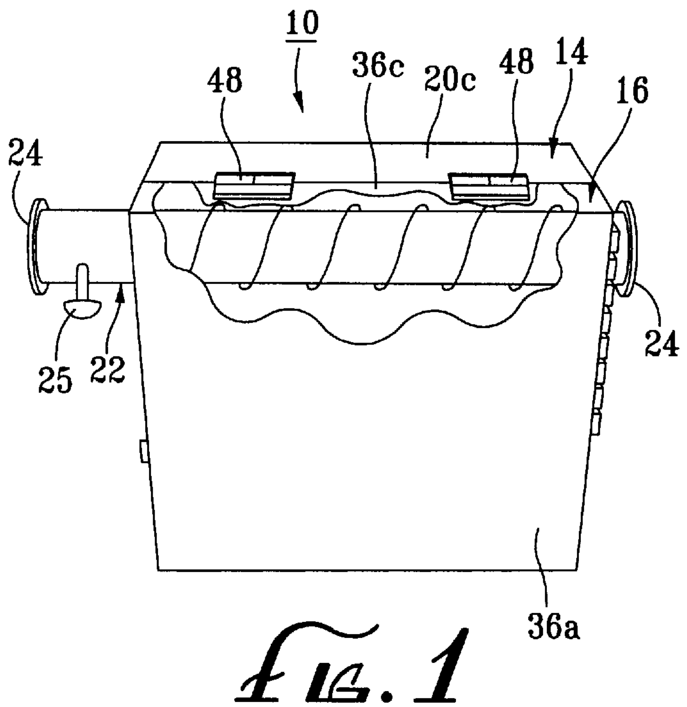
FIG. 1 is a perspective view showing one side of a controller housing having features of the invention.
Figure 2:
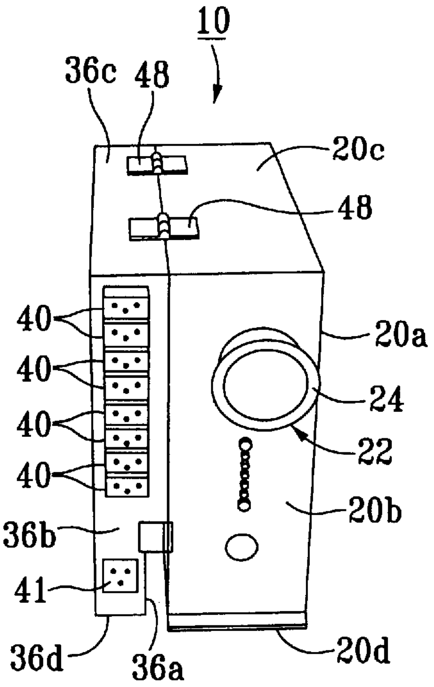
FIG. 2 is a perspective view showing an end view of the controller housing illustrated in FIG. 1.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a controller housing 10 for housing a controller 12, such as a controller used to control a water pool apparatus. The controller housing 10 comprises a first box 14 and a second box 16.

The first box 14 defines a first enclosure 18. The first box 14 has a plurality of walls 20. In a typical embodiment, such as that which is illustrated in the drawings, the first box 14 has six rectangular walls 20, each wall 20 being attached at right angles to each adjacent wall 20. In the embodiment illustrated in the drawings, the first box 14 has two opposed parallel side walls **20*a*, two opposed end walls 20*b*, a top wall 20*c* and a bottom wall 20*d***.

Disposed within the first box 14 may be an electrical heater 22, such as an XL heater exchanger, having opposed fluid connection ends 24. The heater 22 includes a pressure switch 25 to detect the flow of water through the heater 22 and to thereafter activate the heater 22. In operation, the spa heater 22 is disposed in fluid tight communication with the recirculating spa water, such that recirculating water discharged from a centrifugal pump flows through the heater 22 and then back into the main basin of the water pool apparatus. Within the heater 22, the recirculating water is heated as necessary to maintain a predetermined spa water temperature.

Also within the first box 14 are various electrical connections (not shown), including electrical conductors connected to a source of electrical power for driving the electrical heater 22 and for powering the controller 12.

In the embodiment illustrated in the drawings, the first box 14 has an exterior side wall **20*a* and an interior side wall 20*a*. The interior side wall 20*a* forms a connection wall 26 for the first box 14. The connection wall 26 has an interior surface (not shown) and an exterior surface 28**.

Disposed within the connection wall 26 of the first box 14 are one or more first moieties 30 of electrical connectors. Each first moiety 30 is of the type which can be connected to a corresponding second moiety 32 by pressing the first moiety 30 towards the second moiety 32. Typically, each first moiety 30 is either a male electrical connector or a female electrical connector. In the embodiment illustrated in the drawings, the connection wall 26 of the first box 14 has three first moieties 30, each first moiety 30 being a female electrical connector. The first moieties 30 are rigidly disposed on the exterior surface 28 of the connection wall 26. Each of the first moieties 30 are electrically connected to the interior of the first enclosure 18. In a typical embodiment, one or more of the first moieties 30 are high voltage first moieties **30*a* which cooperate with corresponding high voltage second moieties 32***a*. Each of the high voltage first moieties 30*a* are connected to a source of electrical power via electrical connectors (not shown) disposed within the first enclosure 18. One or more of the first moieties 30 are low voltage first moieties 30*b* which cooperate with corresponding low voltage second moieties 32*b*. The low voltage first moieties 30*b* are electrically connected to various spa sensors.

The second box 16 defines a second enclosure 34. Like the first box 14, the second box 16 has a plurality of walls 36. In a typical embodiment, such as that which is illustrated in the drawings, the second box 16 has six rectangular walls 36, each wall 36 being attached at right angles to each adjacent wall 36. Also in the embodiment illustrated in the drawings, the second box 16 has two opposed parallel sidewalls 36*a*, two opposed end walls 36*b*, a top wall 36*c* and a bottom wall 36*d*.

Figure 5:
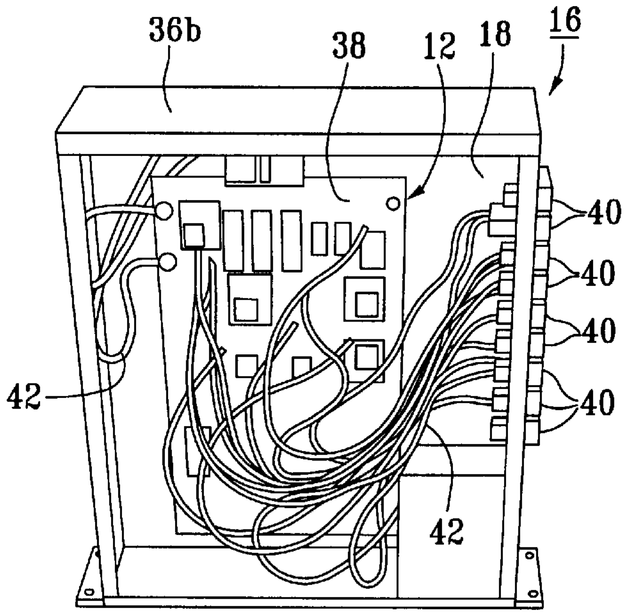
FIG. 5 is a perspective view showing the interior of the first portion of the controller housing illustrated in FIG. 1.

Disposed within the second box 16 is the electrical controller 12 comprising an electrical circuit board 38. The electrical controller 12 can be used to control the various operating equipment which make up the water pool apparatus, including the recirculation pump and the electrical heater 22. The controller 12 is connectable to control signal wires (not shown) from the various water pool apparatus equipment and operating monitors via a plurality of electrical connection receptacles 40 and a control panel phone jack connection 41 disposed in one or more of the walls 36 of the second box 16. In the embodiment illustrated in the drawings, eight female electrical connection receptacles 40 are disposed in one of the two opposed end walls 36*b* of the second box 16. Each of these electrical connection receptacles 40 is connected to the circuit board 38 by connection wires 42 as illustrated in FIG. 5.

In the embodiment illustrated in the drawings, the second box 16 has an exterior side wall 36*a* and an interior side wall 36*a*. The interior side wall 36*a* forms a connection wall 44 for the second box 16. The connection wall 44 of the second box 16 has an interior surface (not shown) and an exterior surface 46.

Rigidly disposed within the connection wall 44 of the second box 16 are one or more second moieties 32 of electrical connectors. Each second moiety 32 is of the type which can be connected to a corresponding first moiety 30 disposed in the connection wall 26 of the first box 14. Typically, each second moiety 32 is either a male electrical connector or a female electrical connector. In the embodiment illustrated in the drawings, the connection wall 44 of the second box 16 has three second moieties 32, each second moiety 32 being a male electrical connector. Each of the three second moieties 32 are aligned with one of the three first moieties 30 in the connection wall 26 of the first box 14, so that each second moiety 32 can be operatively connected to a corresponding first moiety 30 by pressing the connection wall 26 of the first box 14 towards the connection wall 44 of the second box 16. In this manner, the electrical circuit board 38 disposed within the second box 16 is electrically connected to the first enclosure 18.

In the embodiment illustrated in the drawings, the two side walls 20*a* of the first box 14 are essentially the same shape and dimensions as the side walls 36*a* of the second box 16. By this construction, when the second box 16 is disposed in abutment with the first box 14, the top walls 20*b* and 36*b* of the two boxes 14 and 16 are disposed in a single horizontal plane and each of the two opposed end walls 20*b* and 36*b* of the two boxes 14 and 16 are disposed in single vertical planes. This gives the controller housing 10 a compact and aesthetically pleasing appearance.

In the embodiment illustrated in the drawings, the second box 16 is attached to the first box 14 by a pair of disengageable hinges 48. Each hinge 48 is comprised of a male moiety 50 and a female moiety 52. Each hinge 48 is readily disengageable by sliding the male moiety 40 laterally away from the female moiety 52. Conversely, each hinge 48 is readily reengageable by sliding the male moiety 50 back into the female moiety 52. By attaching the second box 16 to the first box 14 using hinges 48, the second moieties 32 of electrical connectors disposed in the connection wall 44 of the second box 16 can be precisely aligned with the first moieties 30 of the electrical connectors disposed within the connection wall 26 of the first box 14, so that rotating the second box 16 towards the first box 14 about the male moieties 50 of the hinges 48 automatically engages the first moieties 30 of the electrical connectors with the second moieties 32. Conversely, when the second box 16 is rotated away from the first box 14 about the male moieties 50 of the hinges 48, the first moieties 30 of the electrical connectors are automatically disengaged from the second moieties 32 of the electrical connectors.

Optionally, a pair of retainer connectors 54 are aligned on each of the two boxes 14 and 16 so as to firmly retain the second box 16 against the first box 14 during normal operation. In the embodiment illustrated in the drawings, the retainer connectors 54 are a pair of apertured clips which can be firmly retained to one another by a bolt and nut connection.

Figure 3:
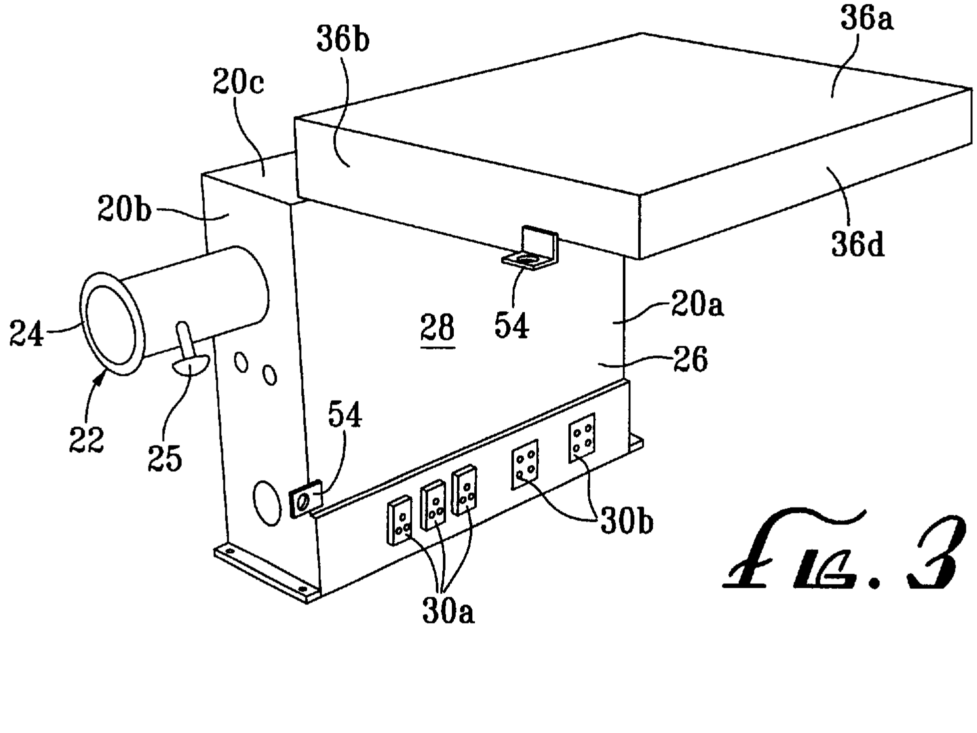
FIG. 3 is a perspective view showing the controller housing of FIG. 1, the view in FIG. 3 showing one portion of the controller housing rotated away from a second portion of the controller housing.
Figure 4:
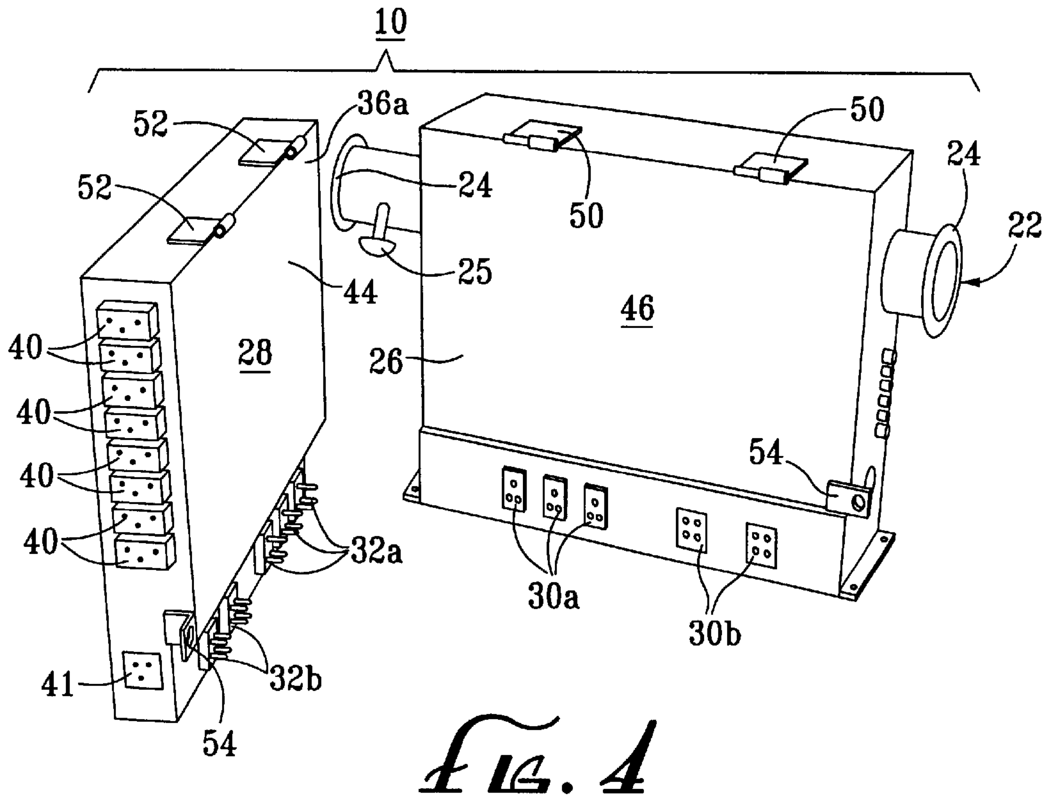
FIG. 4 is a perspective view of the controller housing illustrated in FIG. 1, FIG. 4 showing the two portions of the controller housing separated.

In the design of the invention, the awkwardness, complexity and expense of replacing a failed circuit board 38 within the controller 10 is eliminated. When the circuit board 38 fails, it is replaced with a new circuit board 38 by replacing the entirety of the second box 16. This operation can be simply and quickly accomplished by the owner of the water pool apparatus, without having to hire a trained technician. The user merely disconnects the retainer connectors 54 and swings the second box 16 away from the first box 14 as illustrated in FIG. 3. Next, the user disengages the second box 16 from the first box 14 by sliding the male moieties 50 of the disengageable hinges 48 away from the corresponding female moieties 52, as illustrated in FIG. 4. The user then connects a new second box 16 to the first box 14 by sliding the male moieties 50 of the disengageable hinges 48 into the female moieties 52, rotating the second box 16 towards the first box 14 so as to engage the first moieties 30 of the electrical connectors to the second moieties 32 of the electrical connectors and reconnecting the retainer connectors 54. The entire operation can be accomplished in a matter of seconds. Unlike replacement of circuit boards within control boxes of the prior art, neither the user nor his or her hired technician needs to disconnect and reconnect the many internal connection wires 42 of the electrical circuit board 38. The invention therefore saves the user of the water pool apparatus considerable effort, down time and expense.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A combination unit for use in a water pool apparatus having a water basin and a water recirculation system, the water recirculation system comprising a pump, a filter and a heater, the combination unit comprising:

(a) a first box defining a first enclosure, the first box housing the heater, the first box having a plurality of walls, including a connection wall with an interior surface and an exterior surface, the connection wall of the first box having a first moiety of an electrical connector disposed on its exterior surface, the first moiety of the electrical connector being electrically connected to the first enclosure; and (b) a second box attached to the first box, the second box defining a second enclosure, the second enclosure having an electrical circuit board disposed therein, the electrical circuit board having control circuitry for controlling the operation of the heater, the second box having a plurality of walls including a connection wall with an interior surface and an exterior surface, the connection wall of the second box having a second moiety of the electrical connector disposed on its exterior surface, the second moiety of the electrical connector being electrically connected to the electrical circuit board, the second moiety of the electrical connector being operatively connectable to the first moiety of the electrical connector by aligning the first moiety with the second moiety and by pressing the connection wall of the first box toward the connection wall of the second box, thereby connecting the electrical circuit board to the first enclosure.

2. The combination unit of claim 1 wherein the exterior surfaces of both the connection wall of the first box and the connection wall of the second box are flat.

3. The combination unit of claim 1 wherein the second box is removably attached to the first box by a removable attachment mechanism.

4. The combination unit of claim 3 wherein the removable attachment mechanism comprises a hinge.

5. The combination unit of claim 3 wherein the removable attachment mechanism comprises a pair of disengageable hinges.

6. The combination unit of claim 1 wherein the first box further comprises a first side wall disposed perpendicular to the connector wall of the first box, wherein the second box further comprises a first side wall disposed perpendicular to the connector wall of the second box and wherein the first side wall of the first box is disposed in the same plane as the first side wall of the second box.

7. The combination unit of claim 1 wherein the first box further comprises a first side wall and a second side wall disposed perpendicular to the connector wall of the first box, wherein the second box further comprises a first side wall and a second side wall disposed perpendicular to the connector wall of the second box and wherein the first side wall of the first box is disposed in the same plane as the first side wall of the second box and the second side wall of the first box is disposed in the same plane as the second side wall of the second box.

8. The combination unit of claim 1 wherein the first box further comprises a first side wall, a second side wall and a third side wall disposed perpendicular to the connector wall of the first box, wherein the second box further comprises a first side wall, a second side wall and a third side wall disposed perpendicular to the connector wall of the second box and wherein the first side wall of the first box is disposed in the same plane as the first side wall of the second box, the second side wall of the first box is disposed in the same plane as the second side wall of the second box and the third side wall of the first box is disposed in the same plane as the third side wall of the second box.

9. The combination unit of claim 1 wherein the first box further comprises a first side wall, a second side wall, a third side wall and a fourth side wall disposed perpendicular to the connector wall of the first box, wherein the second box further comprises a first side wall, a second side wall, a third side wall and a fourth side wall disposed perpendicular to the connector wall of the second box and wherein the first side wall of the first box is disposed in the same plane as the first side wall of the second box, the second side wall of the first box is disposed in the same plane as the second side wall of the second box, the third side wall of the first box is disposed in the same plane as the third side wall of the second box and the fourth side wall of the first box is disposed in the same plane as the fourth side wall of the second box.

10. The combination unit of claim 1 wherein both the first box and the second box comprise six rectangular walls, each wall being disposed perpendicular to adjoining walls.

11. The combination unit of claim 1 wherein the first and second moieties of the electrical conductor comprise a male element and a female element.

12. The combination unit of claim 1 wherein the connection wall of the first box comprises a pair of first moieties of electrical connectors disposed on the exterior surface of the connection wall, the first moieties being electrically connected to the first enclosure, wherein the exterior surface of the connection wall of the second box comprises a plurality of second moieties of the electrical connectors, the second moieties being electrically connected to the electrical circuit board and wherein each first moiety is operatively connectable to a respective second moiety by aligning each first moiety with the respective second moiety and by pressing the connection wall of the first box towards the connection wall of the second box, thereby connecting the electrical circuit board to the first enclosure.

13. The combination unit of claim 1 wherein the first moiety of the electrical connector is connected to a source of electrical power via electrical conductors disposed within the first enclosure.

14. A combination unit for use in a water pool apparatus having a water basin and a water recirculation system, the water recirculation system comprising a pump, a filter and a heater, the combination comprising:

(a) a first box defining a first enclosure, the first box housing the heater, the first box having six rectangular walls, each wall being disposed perpendicular to adjoining walls, the six rectangular walls including a connection wall with an interior surface and an exterior surface, the connection wall of the first box having a first moiety of an electrical connector disposed on its exterior surface, the first moiety of the electrical connector being electrically connected to the first enclosure; and (b) a second box attached to the first box, the second box defining a second enclosure, the second enclosure having an electrical circuit board disposed therein, the electrical circuit board having control circuitry for controlling the operation of the water recreational apparatus, the second box having six rectangular walls, each wall being disposed perpendicular to adjoining walls, the six rectangular walls including a connection wall with an interior surface and an exterior surface, the connection wall of the second box having a length and a width identical to that of the connection wall of the first box, the first box and the second box being removably attached to one another by at least one hinge such that the connection wall of the first box is disposed proximate to and parallel with the connection wall of the second box, the connection wall of the second box having a second moiety of the electrical connector disposed on its exterior surface, the first and second moieties of the electrical conductor comprising a male element and a female element, the second moiety of the electrical connector being electrically connected to the electrical circuit board, the second moiety of the electrical connector being operatively connectable to the first moiety of the electrical connector by rotating the first box with respect to the second box about the at least one hinge and pressing the connection wall of the first box toward the connection wall of the second box, thereby connecting the electrical circuit board to the first enclosure.

15. The combination unit of claim 14 wherein the at least one hinge comprises a pair of disengageble hinges.

16. The combination unit of claim 14 wherein the connection wall of the first box comprises a pair of first moieties of electrical connectors disposed on the exterior surface of the connection wall, the first moieties being electrically connected to the first enclosure, wherein the exterior surface of the connection wall of the second box comprises a plurality of second moieties of the electrical connectors, the second moieties being electrically connected to the electrical circuit board and wherein each first moiety is operatively connectable to a respective second moiety by rotating the first box with respect to the second box about the at least one hinge and pressing the connection wall of the first box towards the connection wall of the second box, thereby connecting the electrical circuit board to the first enclosure.

17. The combination unit of claim 14 wherein the first moiety of the electrical connector is connected to a source of electrical power via electrical conductors disposed within the first enclosure.

* * * * *